United States Patent
Geist et al.

(10) Patent No.: US 12,483,547 B2
(45) Date of Patent: *Nov. 25, 2025

(54) AUTHENTICATION PROCESS FOR FACILITATING SECURE ACCESS TO VOICE-ENABLED APPLICATIONS

(71) Applicant: Truist Bank, Charlotte, NC (US)

(72) Inventors: Michael Geist, Woodstock, GA (US); Madhu babu Martheneni, Cumming, GA (US); Bernie Pfeiffer, Cincinnati, OH (US)

(73) Assignee: Truist Bank, Charlotte, NC (US)

( * ) Notice: Subject to any disclaimer, the term of this patent is extended or adjusted under 35 U.S.C. 154(b) by 182 days.

This patent is subject to a terminal disclaimer.

(21) Appl. No.: 18/470,803

(22) Filed: Sep. 20, 2023

(65) Prior Publication Data
US 2025/0094986 A1    Mar. 20, 2025

Related U.S. Application Data

(63) Continuation of application No. 18/470,750, filed on Sep. 20, 2023.

(51) Int. Cl.
*G06Q 20/40* (2012.01)
*H04L 9/40* (2022.01)

(52) U.S. Cl.
CPC ..... *H04L 63/083* (2013.01); *G06Q 20/40145* (2013.01); *G06Q 20/4016* (2013.01); *G06Q 20/409* (2013.01); *H04L 63/0807* (2013.01)

(58) Field of Classification Search
CPC .............. H04L 63/083; H04L 63/0807; H04L 63/0815; G06Q 20/40145; G06Q 20/4016; G06Q 20/409

USPC ................................................ 726/5; 705/75
See application file for complete search history.

(56) References Cited

U.S. PATENT DOCUMENTS

2021/0112065 A1*  4/2021  Yang ..................... H04L 63/108
2025/0077635 A1*  3/2025  Mazumder ............. G06F 21/32

OTHER PUBLICATIONS

On Enabling Additional Natural Person and Domain-Specific Attributes in the eIDAS Network, Berbecaru et al., Jan. 2021 (Year: 2021).*

* cited by examiner

*Primary Examiner* — Jahangir Kabir
(74) *Attorney, Agent, or Firm* — Kilpatrick Townsend & Stockton LLP; Michael A. Springs, Esq.

(57) ABSTRACT

A system can be provided for providing access for internal client devices to a voice-enabled application. For example, the system can receive an access request with an authentication credential associated with an internal client device. The access request can be a request to access the voice-enabled application. In response to receiving the access request, system can verify the internal client device by accessing an active directory with authentication credentials authorized to access the voice-enabled application and by determining that the authentication credential is included the authentication credentials of the active directory. Then, in response to verifying the internal client device, the system can transmit an indication of the verification of the internal client device to the authentication system to cause the authentication system to provide access for the internal client device to the voice-enabled application.

17 Claims, 3 Drawing Sheets

AUTHENTICATION PROCESS FOR FACILITATING SECURE ACCESS TO VOICE-ENABLED APPLICATIONS

CROSS-REFERENCE TO RELATED APPLICATIONS

This is a continuation of U.S. Ser. No. 18/470,750, filed on Sep. 20, 2023 and titled "Authentication Process for Facilitating Secure Access to Voice-Enabled Applications," the disclosure of which is hereby incorporated by reference in its entirety.

TECHNICAL FIELD

The present disclosure relates generally authentication processes for software applications and, more particularly (although not necessarily exclusively), to an authentication process for facilitating secure access to a voice-enabled application.

BACKGROUND

Transaction systems may perform transactions of resources. The transactions of resources can be performed via various channels associated with the transaction systems such as via online deposits channels, wire transfer channels, and other electronic resource transfer channels. In an example, automated clearing house (ACH) can be a transaction system for performing electronic fund transfers between service providers. Additionally, software applications can be associated with transaction systems, such that the software applications may be used by internal clients (e.g., employees of the service provider) or by external clients (e.g., customers of the service provider) to monitor the transactions, initiate the transactions, or perform other suitable operations with respect to the transaction systems. Moreover, to maintain a security of the transactions, there can be a need for efficient and secure authentication mechanisms for software applications.

SUMMARY

According to one example of the present disclosure, a system can include a processor and a memory including instructions that are executable by the processor to perform operations. The operations can include receiving, from an authentication system, an access request comprising an authentication credential associated with an internal client device, the access request being a request to access a voice-enabled application, and the voice-enabled application being configured to generate metadata related to a secure interaction between one or more entities for prevent an adverse event with respect to the secure interaction. The operation can further include, in response to receiving the access request, verifying the internal client device by accessing an active directory comprising a plurality of authentication credentials authorized to access the voice-enabled application and by determining that the authentication credential is included in the plurality of authentication credentials. Additionally, the operations can include, in response to verifying the internal client device, transmitting an indication of the verification of the internal client device to the authentication system to cause the authentication system to provide access for the internal client device to the voice-enabled application.

According to another example of the present disclosure, a non-transitory computer-readable medium may contain instructions that are executable by a processor to cause the processor to perform operations. The operations can include receiving, from an authentication system, an access request comprising an authentication credential associated with an internal client device, the access request being a request to access a voice-enabled application, and the voice-enabled application being configured to generate metadata related to a secure interaction between one or more entities for prevent an adverse event with respect to the secure interaction. The operation can further include, in response to receiving the access request, verifying the internal client device by accessing an active directory comprising a plurality of authentication credentials authorized to access the voice-enabled application and by determining that the authentication credential is included in the plurality of authentication credentials. Additionally, the operations can include, in response to verifying the internal client device, transmitting an indication of the verification of the internal client device to the authentication system to cause the authentication system to provide access for the internal client device to the voice-enabled application.

According to a further example of the present disclosure, a computer-implemented method can include receiving, from an authentication system, an access request comprising an authentication credential associated with an internal client device, the access request being a request to access a voice-enabled application, and the voice-enabled application being configured to generate metadata related to a secure interaction between one or more entities for prevent an adverse event with respect to the secure interaction. The computer-implemented method can further include, in response to receiving the access request, verifying the internal client device by accessing an active directory comprising a plurality of authentication credentials authorized to access the voice-enabled application and by determining that the authentication credential is included in the plurality of authentication credentials. Additionally, the computer-implemented method can include, in response to verifying the internal client device, transmitting an indication of the verification of the internal client device to the authentication system to cause the authentication system to provide access for the internal client device to the voice-enabled application.

DETAILED DESCRIPTION

Figure 1:
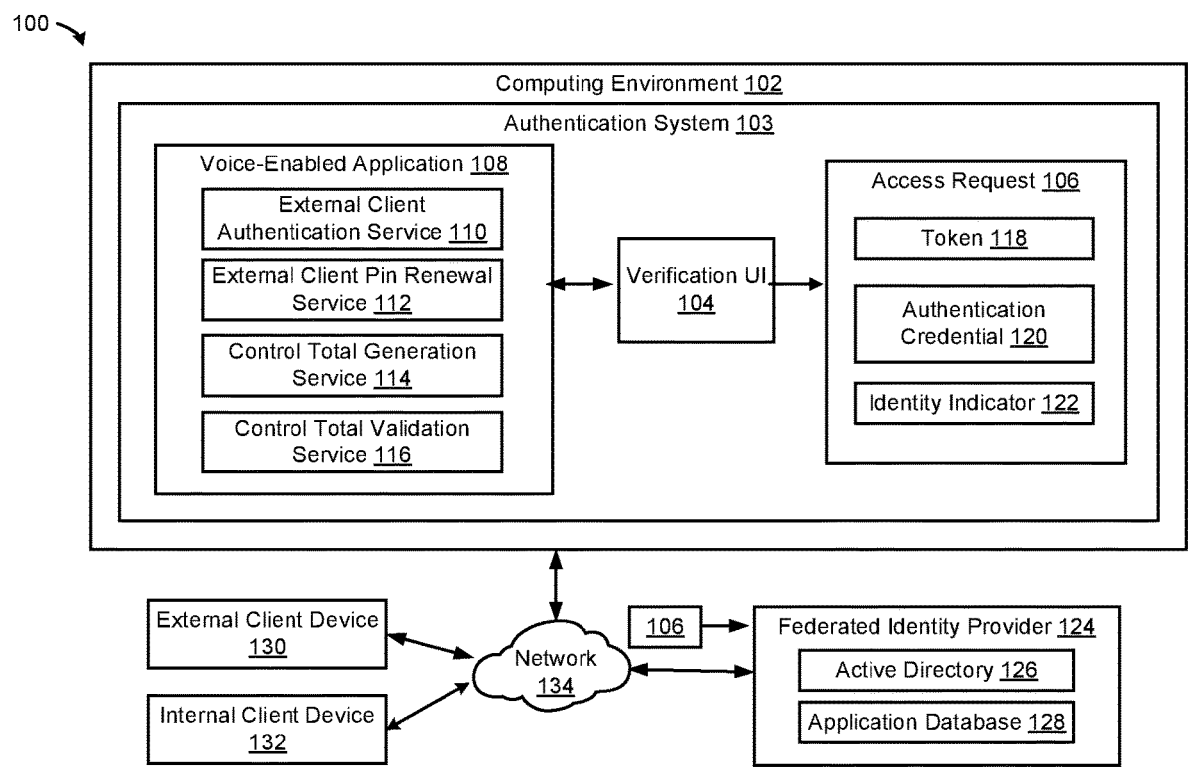
FIG. 1 is a block diagram of an example of a system for performing an authentication process to facilitate secure access to a voice-enabled application according to one example of the present disclosure.

A system can be provided that can perform an authentication process to facilitate secure access to a voice-enabled application (i.e., a software application that receives and processes speech input such as voice commands). The voice-enabled application can be a voice-enabled control total application. Therefore, the voice-enabled application may be configured to generate metadata related to a secure interaction between entities to protect against adverse events, such as a duplicate execution of the secure interaction, inaccurate execution of the secure interaction, fraudulent activities with respect to the secure interaction, etc. The secure access can be provided to internal clients (e.g., employees, authorized personnel, etc.) of a service provider associated with the voice-enabled application. For example, the system can communicate with a federated identity provider to authenticate an internal client device used by an internal client. The federated identity provider can be a mechanism for enabling internal clients to access one or more applications with a single authentication credential (e.g., a username and password). Thus, the system may transmit an authorization credential, such as a username and password used by the internal client to log into the internal client device, to the federated identity provider. The federated identity provider can authenticate the internal client device based on the authorization credentials and can indicate to the system that the internal client device has been authenticated. In response, the system can provide access to the voice-enabled application for the internal client device. In this way, the secure access can be provided to the internal client using the internal client device.

Additionally, the internal clients or external clients can be provided access to web services via the voice-enabled application. The internal clients may, after completion of the authentication process, receive access to a user interface associated with the voice-enabled application, through which the internal clients may access the web services. Conversely, the external clients may provide voice commands via an external client device to interact with the voice-enabled application. For example, the voice commands can cause the voice-enabled application to perform actions associated with the web services.

The web services can include an external client authentication service, in which the voice-enabled application can verify an identity of the external client prior to providing the external client access to other web services. The web services can also include an external client pin renewal service, which can include changing a pin number associated with a client account. The client account can be associated with the service provider. For example, the service provider can be a financial entity and the client account can be a deposit account. The pin number can also be used by the external client when authenticating with the voice-enabled application. For example, the external client can provide a voice command that includes the spoken pin number. The voice-enabled application can receive the voice command from the external client device and can authenticate the external client based on the voice command. The web services can further include a control total generation service. The control total can be a control mechanism (e.g., metadata) related to a data file and can be generated to protect against adverse events, such as fraudulent activities, the data file being duplicated, etc. For example, the data file can be related to a secure interaction in which the data file may be transferred between two entities and the control total can include metadata for the data file. The metadata can include a total amount of data in the data file or other suitable metadata for the data file. The metadata can be used to validate the transfer of the data file to confirm that the transfer of the data file is performed accurately, to protect against the fraudulent activities, to prevent the secure interaction from being executed more than once, etc. Additionally, the control total, including the metadata, can be access via the voice-enabled application. Therefore, by generating the control total via the voice-enabled application, the data file can be verified to facilitate the secure interaction and to prevent the adverse events. The verification of control totals can be another web service provided by the voice-enabled application.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a system 100 for performing an authentication process to facilitate secure access to a voice-enabled application 108 according to one example of the present disclosure. The system 100 includes an authentication system 103 that can operate on a computing environment 102. In some examples, the computing environment 102 may be a distributed computing environment, such as a cloud computing system or a computing cluster, formed from one or more nodes (e.g., physical or virtual servers) that are in communication with one another via a network 134. Examples of the network 134 can include a local area network or the Internet. The computing environment 102 can be formed from a physical infrastructure that includes various network hardware, such as routers, hubs, bridges, switches, and firewalls. The physical infrastructure can also include one or more servers through which internal or external clients can perform tasks related to a service provider. The internal clients can be employees, authorized personnel, etc. associated with the service provider. The external clients can be customers or clients of the service provider such as users of accounts associated with the service provider. For example, the tasks may include secure transactions to or from client accounts associated with the service provider. The servers may provide backend support for a software application (e.g., a voice-enabled application 108) or may provide a web interface for enabling the internal or external clients to perform the tasks. The system 100 can also include an internal client device 132 and an external client device 130 for enabling the internal or external clients to interact with the software application or web interface.

In some examples, the voice-enabled application 108 can be a software application through which the internal or external clients can access web services. The external clients may interact with the voice-enabled application 108 via the external client device 130, which can be a phone, tablet, laptop, or other suitable device. Additionally, the external clients may provide voice commands via the external client device 130 to interact with the voice-enabled application 108. For example, the voice commands can cause the voice-enabled application 108 to provide the external client device 130 access to the web services or can cause the voice-enabled application 108 to perform actions associated with the web services.

The web services can include an external client authentication service 110, in which the voice-enabled application 108 can verify an identity of the external client prior to providing the external client device 130 access to other web services. The web services can also include an external client pin renewal service 112, which can include changing a pin number associated with a client account. Additionally, the web services can include a control total generation service 114. The control total can be a control mechanism (e.g., metadata) related to secure interaction between entities, such as a transfer of a data file between the entities. The control total can be generated to protect against adverse events such as fraudulent events with respect to the secure transaction, inaccurate execution of the secure interaction, duplicate execution of the secure transaction, etc. For example, an automated clearing house (ACH) payment file can be transmitted to cause a secure interaction between a client account and an entity account. Therefore, the control total (i.e., the metadata) generated can include a credit total for the secure interaction, a debit amount for the secure interaction, or other suitable metadata relating to the ACH payment file. The web services can further include a control total validation service 116. For example, the voice-enabled application 108 can verify that the control total generated matches information for the ACH payment file to facilitate the secure interaction and protect against the adverse events.

In some examples, the internal clients may interact with the voice-enabled application 108 via the internal client device 132, which can be a phone, tablet, laptop, or other suitable device. The internal client device 132 may be provided access to a user interface (UI) through which the internal clients can interact with the voice-enabled application 108. For example, the internal clients can use the UI to cause the voice-enabled application 108 to provide the external clients access to the web services, to resolve an issue with a web service on behalf of an external client, or to perform other suitable actions associated with the voice-enabled application 108.

To provide access for an internal client to the voice-enabled application 108, the authentication system 103 may perform an authentication process. For example, the authentication system 103 may detect a selection of the voice-enabled application 108 by an internal client device 132. The selection can be a request to access or use the voice-enabled application 108. The authentication system 103 may detect the selection of the voice-enabled application 108 by receiving an authentication credential 120 for the internal client device 132. For example, the internal client using the internal client device 132 may provide the authentication credential 120 to access the internal client device 132. Then, the authentication system 103 may provide access, based on the authentication credential 120, for the internal client device 132 to a verification user interface (UI) 104. The verification UI 104 can include options for applications accessible via the internal client device 132, including a particular option for the voice-enabled application 108. Thus, the internal client may select the particular option and, in response, the internal client device 132 may transmit an indication of the selection to the authentication system 103.

Additionally, in some examples, in response to detecting the selection of the voice-enabled application 108 by the internal client device 132, the authentication system 103 may generate a token 118 for the internal client device 132. The token 118 can include the authentication credential 120 for the internal client device 132. The token 118 may also include an identity indicator 122, which can be associated with the voice-enabled application 108. Therefore, the identity indicator 122 can specify that the token 118 was generated in response to detecting the selection of the voice-enabled application 108 rather than in response to a selection of another software application. Additionally, the token 118 may be used by the internal client device 132 to access or to request access to the voice-enabled application 108.

In response to detecting the selection of the voice-enabled application 108, the authentication system 103 can transmit an access request 106 to a federated identity provider 124.

In some examples, the authentication system 103 may transmit the access request 106 by forwarding the authentication credential 120 used by the internal client to access the internal client device 132 to the federated identity provider 124. The authentication system 103 may also forward the identity indicator 122 to indicate to the federated identity provider 124 that the access request 106 is for the voice-enabled application 108. Thus, the access request 106 can include the authentication credential 120, the identity indicator 122, or a combination thereof. Additionally, in some examples, transmitting the access request 106 can include transmitting the token 118 to the federated identity provider 124.

Additionally, the federated identity provider 124 can be a mechanism for enabling authorized users to access one or more applications with a single authentication credential (e.g., a username and password) to facilitate secure and efficient authentication with the one or more applications. Therefore, the federated identity provider 124 may determine whether the authentication credential 120 is valid for authenticating with the voice-enabled application 108. In this way, the federated identity provider 124 can authenticate the internal client device 132.

For example, the federated identity provider 124 may authenticate internal client device 132 by accessing an active directory 126, which can include a first set of authentication credentials authorized to access the voice-enabled application 108. The federated identity provider 124 can determine whether the authentication credential 120 is included in the first set of authentication credentials. Additionally or alternatively, the federated identity provider 124 can access, based on the identity indicator 122, an application database 128. The application database 128 can be a database for voice-enabled application 108 that includes a second set of authentication credentials authorized to access the voice-enabled application 108. Then, the federated identity provider 124 can determine whether the authentication credential 120 is included in the second set of authentication credentials.

Therefore, federated identity provider 124 can authenticate the internal client device 132 based on the authentication credential 120 in the access request 106 being included in the active directory 126, the application database 128, or a combination thereof. The authentication system 103 may receive the authentication of the internal client device 132 from the federated identity provider 124, and in response, the authentication system 103 can provide access for the internal client device 132 to the voice-enabled application 108. By providing access to the internal client device 132, the internal client can interact with the voice-enabled application 108 via the internal client device 132. For example, the internal client device 132 can be provided access to the metadata to enable the internal client to view, analyze, etc. the metadata.

Additionally, if the authentication credential 120 is not in the active directory 126 or the application database 128, the federated identity provider 124 may fail to authenticate the internal client device 132. In response, the federated identity provider 124 can transmit an indication of the failure to authenticate the internal client device 132 to the authentication system 103. As a result, the authentication system 103 may deny the internal client device 132 access to the voice-enabled application 108.

By using the federated identity provider 124, the authentication system 103 can automate the authentication of internal client devices. For example, by forwarding the authentication credential 120 to the federated identity provider 124, the internal client may not be required to re-enter authentication credential to access the voice-enabled application 108 or other available software applications. Additionally, by automatically providing access for the internal client device 132 based on the authentication received from the federated identity provider 124, the authentication system 103 can provide an efficient and secure authentication process for the internal clients.

Figure 2:
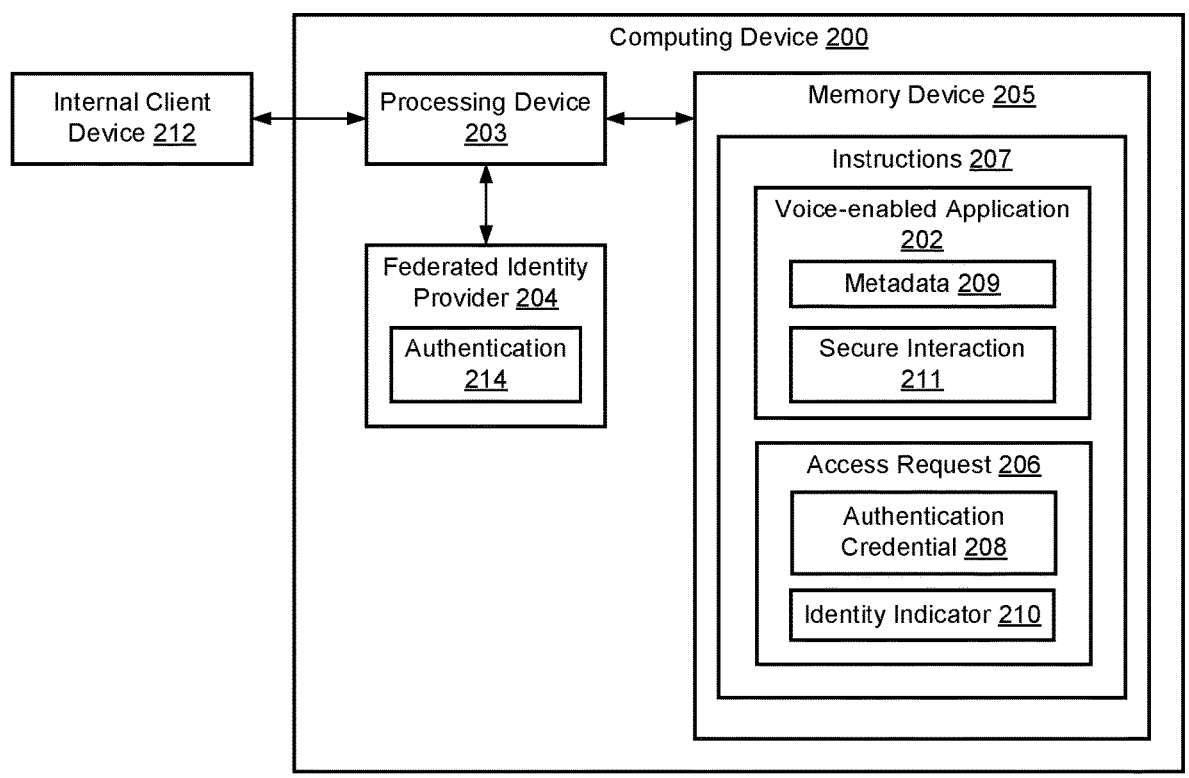
FIG. 2 is a block diagram of an example of a computing device for performing an authentication process to facilitate secure access to a voice-enabled application according to one example of the present disclosure.

FIG. 2 is a block diagram of an example of a computing device 200 for performing an authentication process to facilitate secure access to a voice-enabled application 202 according to one example of the present disclosure. As depicted, the computing device 200 may include a processing device 203 communicatively coupled to a memory device 205. In some examples, the components shown in FIG. 2 can be integrated into a single structure. For example, the components can be within a single housing. In other examples, the components shown in FIG. 2 can be distributed (e.g., in separate housings) and in electrical communication with each other.

The processing device 203 can execute one or more operations for implementing some examples. The processing device 203 can execute instructions 207 stored in the memory device 205 to perform the operations. The processing device 203 can include one processing device or multiple processing devices. Non-limiting examples of the processing device 203 include a Field-Programmable Gate Array ("FPGA"), an application-specific integrated circuit ("ASIC"), a microprocessor, etc. In some examples, the instructions 207 can include processor-specific instructions generated by a compiler or an interpreter from code written in any suitable computer-programming language, such as C, C++, C #, Python, or Java.

The memory device 205 can include one memory or multiple memories. The memory device 205 can be non-volatile and may include any type of memory that retains stored information when powered off. Non-limiting examples of the memory device 205 include electrically erasable and programmable read-only memory (EEPROM), flash memory, or any other type of non-volatile memory. At least some of the memory device 205 can be a non-transitory, computer-readable medium from which the processing device 203 can read the instructions 207. A computer-readable medium can include electronic, optical, magnetic, or other storage devices capable of providing the processing device 203 with computer-readable instructions or other program code. Non-limiting examples of a computer-readable medium include magnetic disk(s), memory chip(s), ROM, random-access memory (RAM), an ASIC, a configured processor, optical storage, or any other medium from which the processing device 203 can read the instructions 207.

The processing device 203 can execute the instructions 207 to perform operations. For example, the processing device 203 can detect a selection of a voice-enabled application 202 by an internal client device 212. The voice-enabled application 202 can be configured to generate metadata 209 related to a secure interaction 211 between one or more entities to prevent an adverse event with respect to the secure interaction 211. In response to detecting the selection of the voice-enabled application 202, the processing device 203 can transmit an access request 206 to a federated identity provider 204. The access request 206 can include an authentication credential 208 associated with the internal client device 212 and an identity indicator 210 associated with the voice-enabled application 202. The processing device 203 can further receive, from the federated identity provider 204, an authentication 214 of the internal client device 212 based on the authentication credential 208 and the identity indicator 210. Additionally, in response to receiving the authentication 214 of the internal client device 212, the processing device 203 can provide access for the internal client device 212 to the voice-enabled application 202, which can enable the internal client device 212 to access the metadata 209.

Figure 3:
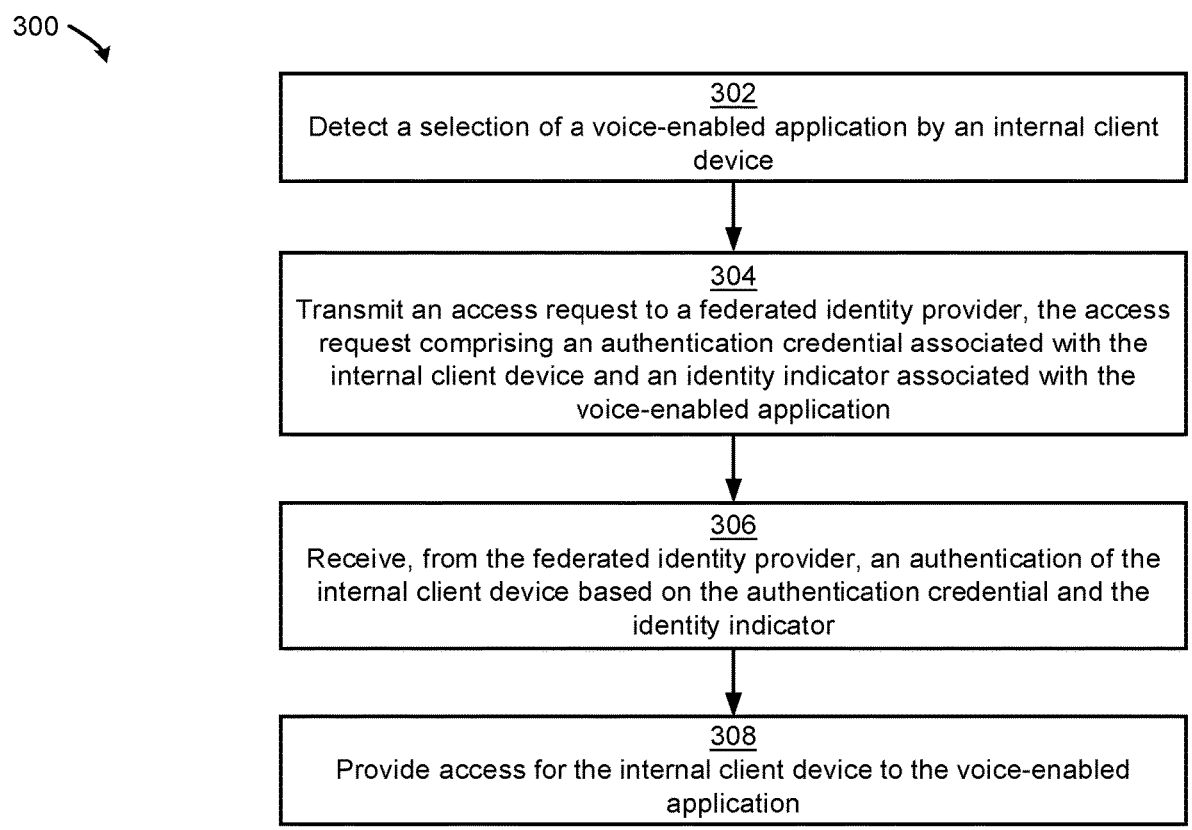
FIG. 3 is a flowchart of an authentication process for facilitating secure access to a voice-enabled application according to one example of the present disclosure.

FIG. 3 is a flowchart of an authentication process 300 for facilitating secure access to a voice-enabled application 108 according to one example of the present disclosure. The authentication process of FIG. 3 can be implemented by the authentication system 103 of FIG. 1 or the computing device 200 of FIG. 2, but other implementations are also possible. While FIG. 3 depicts a certain sequence of steps for illustrative purposes, other examples can involve more steps, fewer steps, different steps, or a different order of the steps depicted in FIG. 3. The steps of FIG. 3 are described below with reference to the components of FIGS. 1-2 described above.

At block 302, the processing device 203 can detect a selection of the voice-enabled application 108 by an internal client device 132. The voice-enabled application 108 can be a voice-enabled control total application. Thus, the voice-enabled application 108 can be configured to generate metadata 209 related to a secure interaction 211 between one or more entities to prevent an adverse event with respect to the secure interaction 211. Additionally, the selection can be a request to access or use the voice-enabled application 108. In some examples, the processing device 203 may detect the selection of the voice-enabled application 108 by receiving an authentication credential 120 for the internal client device 132. For example, an internal client of the internal client device 132 may provide the authentication credential 120 (e.g., a username and password) when accessing the internal client device 132. The processing device 203 can then provide access, based on the authentication credentials 120, for the internal client device 132 to a verification user interface (UI) 104. The verification UI 104 can include an option for the voice-enabled application 108. Therefore, the internal client may select the option via the verification UI 104 on the internal client device 132. As a result, the processing device 203 can detect the selection of the option.

In some examples, in response to detecting the selection of the voice-enabled application 108 by the internal client device 132, the processing device 203 may generate a token 118 for the internal client device 132. The token 118 can include the authentication credential 120 and may further include an identity indicator 122. The identity indicator 122 can be associated with the voice-enabled application 108. Therefore, the identity indicator 122 can specify that the token 118 was generated in response to detecting the selection of the voice-enabled application 108 rather than in response to a selection of another software application. Additionally, the token 118 can be used to access the voice-enabled application 108.

At block 304, the processing device 203 can transmit an access request 106 to a federated identity provider 124. The access request 106 can include the authentication credential 120 associated with the internal client device 132 and the identity indicator 122 associated with the voice-enabled application 108. The processing device 203 may automatically transmit the access request 106 in response to detecting the selection of the voice-enabled application 108. Additionally, transmitting the access request 106 may include the processing device 203 forwarding the authentication credentials 120 used by the internal client to access the internal client device 132 to the federated identity provider 124. Additionally or alternatively, transmitting the access request 106 can include the processing device 203 transmitting the token 118 to the federated identity provider 124.

At block 306, the processing device 203 can receive, from the federated identity provider 124, authentication of the internal client device 132 based on the authentication credential 120 and the identity indicator 122. In some examples, the federated identity provider 124 may authenticate the access request 106 by accessing an active directory 126, which can include a first set of authentication credentials authorized to access the voice-enabled application 108. The federated identity provider can further determine that the authentication credentials 120 are included in the first set of authentication credentials.

Additionally or alternatively, the federated identity provider 124 can access, based on the identity indicator 122, an application database 128. For example, the identity indicator 122 can indicate to the federated identity provider 124 that the internal client device 132 is requesting access to the voice-enabled application 108. Therefore, the application database 128 can be a database for the voice-enabled application 108. The application database 128 can include a second set of authentication credentials authorized to access the voice-enabled application 108. Then, the federated identity provider 124 can determine that the authentication credentials 120 are included in the second set of authentication credentials.

Therefore, federated identity provider 124 can authenticate the internal client device 132 based on the authentication credentials 120 in the access request being included in the active directory 126, the application database 128, or a combination thereof. In some examples, if the authentication credentials 120 are not in the active directory 126 or the application database 128, the federated identity provider 124 may fail to authenticate the internal client device 132. In response, the federated identity provider 124 can transmit an indication of the failure to authenticate the internal client device 132 to the processing device 203. As a result, the processing device 203 may deny the internal client device 132 access to the voice-enabled application 108.

At block 308, the processing device 203 can provide access for the internal client device 132 to the voice-enabled application 108. The processing device 203 may provide the access for the internal client device 132 to enable the internal client device 132 to access the metadata 209. Upon access to the voice-enabled application 108, the internal client device 132 can access web services provided by the voice-enabled application 108, such as an external client authentication service 110, an external client pin renewal service 112, a control total generation service 114, or a control total validation service 116. In this way, the internal client of the internal client device 132 may be permitted to execute the web services on behalf of an external client, check on an issue with a web service on behalf of the external client, or perform other suitable operations with respect to the web services.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a processing device; and
   a memory device that includes instructions executable by the processing device for causing the processing device to perform operations comprising:
   receiving, from an authentication system, an access request comprising an authentication credential associated with an internal client device and an identity indicator associated with a voice-enabled application, the access request being a request to access the voice-enabled application, the voice-enabled application being configured to generate metadata related to a secure interaction between two or more entities to prevent an adverse event with respect to the secure interaction, the secure interaction involving transmission of a data file from a first entity of the two or more entities to a second entity of the two or more entities, and the voice-enabled application providing a plurality of services, the plurality of services comprising a first service for generating an amount of data in the data file and a second service for verifying the data file based on the amount of data in the data file;
   in response to receiving the access request, verifying the internal client device by:
      accessing an active directory comprising a first plurality of authentication credentials authorized to access the voice-enabled application;
      determining that the authentication credential is included in the first plurality of authentication credentials;
      subsequent to determining that the authentication credential is included in the first plurality of authentication credentials, accessing, based on the identity indicator, an application database comprising a second plurality of authentication credentials authorized to access the voice-enabled application; and
      determining that the authentication credential is included in the second plurality of authentication credentials; and
   in response to verifying the internal client device, transmitting an indication of the verification of the internal client device to the authentication system to cause the authentication system to provide access for the internal client device to the voice-enabled application, the access to the voice-enable application usable by the internal client device to access the metadata and the plurality of services.

2. The system of claim 1, wherein access request is a first access request and the authentication credential is a first authentication credential, and wherein the memory device further includes instructions executable by the processing device for causing the processing device to perform operations comprising:
   receiving, from the authentication system, a second access request comprising a second authentication credential associated with the internal client device, wherein the second access request is a request to access the voice-enabled application;
   in response to receiving the access request:
      accessing the active directory comprising the first plurality of authentication credentials authorized to access the voice-enabled application; and
      determining that the second authentication credential is excluded from the first plurality of authentication credentials;

detecting an authentication failure of the internal client device based the second authentication credential being excluded from the first plurality of authentication credentials; and
in response to detecting the authentication failure, transmit an indication of the authentication failure to the authentication system to cause the authentication system to deny access for the internal client device to the voice-enabled application.

3. The system of claim 1, wherein the authentication system provides access, for the internal client device, to a verification user interface (UI), wherein the verification UI includes an option for requesting access to the voice-enabled application, wherein authentication system detects a selection of the option via the verification UI, and wherein the access request is received in response to the authentication system detecting the selection of the option via the verification UI.

4. The system of claim 3, wherein the authentication system, in response to detecting the selection of the voice-enabled application by the internal client device, generates a token for the internal client device, wherein the token includes the authentication credential.

5. The system of claim 4, wherein the operation of receiving, from the authentication system, the access request comprises receiving the token.

6. The system of claim 1, wherein the plurality of services further comprise a third service for authenticating an external client device and a fourth service for changing a personal identficiation number associated with the external client device.

7. A method comprising:
receiving, from an authentication system, an access request comprising an authentication credential associated with an internal client device and an identity indicator associated with a voice-enabled application, the access request being a request to access the voice-enabled application, the voice-enabled application being configured to generate metadata related to a secure interaction between two or more entities to prevent an adverse event with respect to the secure interaction, the secure interaction involving transmission of a data file from a first entity of the two or more entities to a second entity of the two or more entities, and the voice-enabled application providing a plurality of services, the plurality of services comprising a first service for generating an amount of data in the data file and a second service for verifying the data file based on the amount of data in the data file;
in response to receiving the access request, verifying the internal client device by:
accessing an active directory comprising a first plurality of authentication credentials authorized to access the voice-enabled application; and
determining that the authentication credential is included in the first plurality of authentication credentials;
subsequent to determining that the authentication credential is included in the first plurality of authentication credentials, accessing, based on the identity indicator, an application database comprising a second plurality of authentication credentials authorized to access the voice-enabled application; and
determining that the authentication credential is included in the second plurality of authentication credentials; and
in response to verifying the internal client device, transmitting an indication of the verification of the internal client device to the authentication system to cause the authentication system to provide access for the internal client device to the voice-enabled application, the access to the voice-enable application usable by the internal client device to access the metadata and the plurality of services.

8. The method of claim 7, wherein access request is a first access request and the authentication credential is a first authentication credential, and wherein the method further comprises:
receiving, from the authentication system, a second access request comprising a second authentication credential associated with the internal client device, wherein the second access request is a request to access the voice-enabled application;
in response to receiving the access request:
accessing the active directory comprising the first plurality of authentication credentials authorized to access the voice-enabled application; and
determining that the second authentication credential is excluded from the first plurality of authentication credentials;
detecting an authentication failure of the internal client device based the second authentication credential being excluded from the first plurality of authentication credentials; and
in response to detecting the authentication failure, transmit an indication of the authentication failure to the authentication system to cause the authentication system to deny access for the internal client device to the voice-enabled application.

9. The method of claim 7, wherein the authentication system provides access, for the internal client device, to a verification user interface (UI), wherein the verification UI includes an option for requesting access to the voice-enabled application, wherein authentication system detects a selection of the option via the verification UI, and wherein the access request is received in response to the authentication system detecting the selection of the option via the verification UI.

10. The method of claim 9, wherein the authentication system, in response to detecting the selection of the voice-enabled application by the internal client device, generates a token for the internal client device, wherein the token includes the authentication credential.

11. The method of claim 10, wherein receiving, from the authentication system, the access request comprises receiving the token.

12. The method of claim 7, wherein the plurality of services further comprise a third service for authenticating an external client device and a fourth service for changing a personal identficiation number associated with the external client device.

13. A non-transitory computer-readable medium comprising instructions that are executable by a processing device for causing the processing device to perform operations comprising:
receiving, from an authentication system, an access request comprising an authentication credential associated with an internal client device and an identity indicator associated with a voice-enabled application, the access request being a request to access the voice-enabled application, the voice-enabled application being configured to generate metadata related to a secure interaction between two or more entities to prevent an adverse event with respect to the secure interaction, the secure interaction involving transmission of a data file from a first entity of the two or more entities to a second entity of the two or more entities, and the voice-enabled application providing a plurality of services, the plurality of services comprising a first service for generating an amount of data in the data file and a second service for verifying the data file based on the amount of data in the data file;

in response to receiving the access request, verifying the internal client device by:

accessing an active directory comprising a first plurality of authentication credentials authorized to access the voice-enabled application; and determining that the authentication credential is included in the first plurality of authentication credentials;

subsequent to determining that the authentication credential is included in the first plurality of authentication credentials, accessing, based on the identity indicator, an application database comprising a second plurality of authentication credentials authorized to access the voice-enabled application; and determining that the authentication credential is included in the second plurality of authentication credentials; and in response to verifying the internal client device, transmitting an indication of the verification of the internal client device to the authentication system to cause the authentication system to provide access for the internal client device to the voice-enabled application, the access to the voice-enable application usable by the internal client device to access the metadata and the plurality of services.

14. The non-transitory computer-readable medium of claim 13, wherein access request is a first access request and the authentication credential is a first authentication credential, and further comprising instructions executable by the processing device for causing the processing device to perform operations comprising:

receiving, from the authentication system, a second access request comprising a second authentication credential associated with the internal client device, wherein the second access request is a request to access the voice-enabled application;

in response to receiving the access request:

accessing the active directory comprising the first plurality of authentication credentials authorized to access the voice-enabled application; and determining that the second authentication credential is excluded from the first plurality of authentication credentials;

detecting an authentication failure of the internal client device based the second authentication credential being excluded from the first plurality of authentication credentials; and in response to detecting the authentication failure, transmit an indication of the authentication failure to the authentication system to cause the authentication system to deny access for the internal client device to the voice-enabled application.

15. The non-transitory computer-readable medium of claim 13, wherein the authentication system provides access, for the internal client device, to a verification user interface (UI), wherein the verification UI includes an option for requesting access to the voice-enabled application, wherein authentication system detects a selection of the option via the verification UI, and wherein the access request is received in response to the authentication system detecting the selection of the option via the verification UI.

16. The non-transitory computer-readable medium of claim 15, wherein the authentication system, in response to detecting the selection of the voice-enabled application by the internal client device, generates a token for the internal client device, wherein the token includes the authentication credential.

17. The non-transitory computer-readable medium of claim 16, wherein the operation of receiving, from the authentication system, the access request comprises receiving the token.

\* \* \* \* \*